Patented Feb. 3, 1953

2,627,471

UNITED STATES PATENT OFFICE 2,627,471

PACKAGING MATERIAL

Laurence E. Dowd, Chicago, Ill., assignor to Transparent Package Company, Chicago, Ill., a corporation of Illinois No Drawing. Application November 1, 1950, Serial No. 193,519

6 Claims. (Cl. 99—176)

This invention relates to packaging materials and particularly to a composite film material for packaging perishable commodities.

Regenerated cellulose casings, particularly in seamless tube form, are widely used for a great variety of meat products including meat loaf items, hams, salami, Bologna, wieners and the like, and are useful as an encasing material for those meat items whose moisture content is low enough so that "shrinkage"—loss of moisture on storage—is not a serious practical matter. However, due to its moisture-vapor permeability, regenerated cellulose casings are not entirely satisfactory for use with those meat products which have a particular tendency to lose moisture or change color on prolonged exposure to the atmosphere. In this connection it has not been found entirely satisfactory to package such products as hams and the like by encasing the same in regenerated cellulose, for the reason that on storage, excessive dehydration and objectionable color changes take place in the meat, frequently resulting in unsaleable products.

The use of a moisture and air impervious film material on such items as hams, while eliminating the dehydration problem associated with regenerated cellulose encasing materials, tends to allow the growth of molds on the surface of the encased meat product, as well as inducing in some instances, anaerobic putrefaction, the development of botulins and the like.

Attempts to modify the permeability characteristics of regenerated cellulose casings so as to avoid the aforesaid undesirable features associated with highly permeable as well as impermeable films have not been entirely successful due to the exacting performance requirements and conditions of use associated with encasing food products of the type in question. Thus neither waxing, varnishing or lacquering regenerated cellulose film as taught by the prior art has resulted in a practical casing material for meats for a variety of reasons, an important one being that the adhesive characteristics of the materials used are inadequate to satisfy the functional requirements of such casing. For example, we have found that with lacquered regenerated cellulose casings, moisture egress will frequently "lift" the coating off of the regenerated cellulose of the casing. A commercially practical coated casing must not only permit controlled moisture-vapor permeation through the casing, but concurrently the surface coating must not peel or crack, in the presence or absence of water and must be able to stretch and shrink at the same rate as the regenerated cellulose component of the casing. This latter requirement is of great importance since, in the case of hams for example, a tubular casing must undergo considerable stretching in following uneven contours when the ham is inserted therein, in order to form a skin-tight compact package.

Accordingly, an important object of my invention is to provide a novel composite casing having desirable moisture and air permeability characteristics.

Another object is to provide a method of producing a coated regenerated cellulose casing which is capable of stretching and shrinking without substantially altering predetermined moisture and air permeability characteristics of said casing.

A further object is to provide a composite tubular casing of regenerated cellulose film coated with a moisture and air permeability controlling material which has a unique bonding affinity for regenerated cellulose film.

A further object is to provide a method of bonding a moisture and air permeability controlling coating to regenerated cellulose encasing material.

In accordance with the present invention a mixture of certain polymerizable resins, wax, and an accelerator, is applied uniformly to the surfaces of a regenerated cellulose tube, and then cured, by heating in air, or by other suitable methods to effect a binding of the coating to the surface of the regenerated cellulose film.

The coating thickness is controlled so as to provide a final product having a moisture-vapor permeability which may be from 0.5 to 50 or 60% of the permeability of untreated regenerated cellulose.

The treatment does not substantially alter the color, transparency, strength or stretch characteristics of untreated regenerated cellulose casing, and results in a composite product which is eminently suitable for packaging of meat items which are sensitive to both insufficient and excessive moisture permeability, such as boiled hams and the like.

It is an important and unique attribute of the composite casing of my invention that it will retain its desirable characteristics even under such drastic treatment as stretching it over the irregular contours of an item such as a ham to get a "tight" package, or immersion in boiling water for as long as several hours, without separation of the component parts of the casing.

In practicing the present invention in accordance with the presently preferred procedure, a mixture of synthetic unsaturated ester compositions, such as are formed by reacting bis-phenol and epichlorhydrin, as set forth in U. S. Patent No. 2,456,408, fatty acids of drying oils as linseed, soya and the like, metallic dryer, and solvent such as mineral spirits, is heated to about 60–90° C. with stirring. To this is added from about 5–10% (based on the solids content of the aforesaid mixture) of a paraffin wax having a melting point of between about 125–140° C. There is concurrently added an accelerator such as mono- or di-tertiary butyl hydroperoxide. The accelerator may be omitted, however, in such case it is necessary to heat the coated casing for a longer period of time to effect good bonding. I have found that the aforesaid accelerators not only reduce the curing time of the coated casing, but that additionally these curing agents are uniquely adapted for use with casings which are to be utilized in packaging foods, since they decompose in action to volatile by-products which are removed during further processing.

The above mixture is heated, with mixing, at about 60–80° C. for about ten minutes to sixty minutes and is then applied to the surface of the casing, preferably hot, as by spraying, brushing, dipping or printing. A presently preferred thickness of coating is from about 0.1 to 0.4 mil. After coating, the casing is heated to 80–100° C. until the coating has dried to a tack-free condition.

The ester product which forms one component of the coating material used in preparing the composite casing of my invention may be selected from those described in U. S. Patent No. 2,456,408 and consists of higher fatty acid esters of polymeric polyhydric alcohols, which alcohols may be prepared in known manner from polyhydric phenols with polyhalo alcohols, epihalohydrins, or polyepoxy compounds.

A particular polymeric polyhydric alcohol which I have used with good success in practicing my invention is a commercially available epichlorhydrin-bis-phenol resin having a melting point of about 95–105° C. and an equivalent weight of about 174. A preferred form of casing, to which the aforesaid coating compositions are applied, is a plasticized regenerated cellulose seamless tube, made in known manner as set forth, for example, in United States Patents Nos. 1,601,686; 1,937,225; 1,997,349; and 2,013,491.

The nature and preparation of the improved casings of my invention will be illustrated by the following examples.

EXAMPLE 1

54.5 lbs. of commercial processed linseed oil fatty acids is heated with agitation, in a reaction kettle fitted with an agitator to 475° F. Then 36.2 lbs. of epichlorhydrin-bis-phenol resin having an M. P. of about 95° C. and an equivalent weight of 174, is added slowly to the processed linseed oil fatty acids. Agitation is continued until a clear pill is obtained and the acid number of mixture, on a solids basis, is 15 plus or minus 1. At this point 8.0 lbs. of commercial processed tung oil fatty acids is added and the temperature is again raised to 475° F. The mixture is held at this temperature for about one and one-quarter hours or until the acid number of the mixture is about 20. At this point 1.3 lbs. of glycerine are added, and the mixture held at 470° F. until the acid number is about 10 on a solids basis, and the viscosity is H to K (Gardner-Holdt) at 50% nonvolatile matter in xylene. At this point the mixture is thinned with xylene and there is added thereto 0.03 lb. of cobalt (as the naphthenate) and 0.01 lb. of calcium (as the naphthenate).

The above mixture is heated, with agitation, to about 60° C., and there is added from about 5% (based on solids content) of a refined paraffin wax having an M. P. of 125° C., and 1% of mono-tertiary butyl hydroperoxide. Other peroxides which may be used are di-butyl tertiary hydroperoxide and cumene hydroperoxides.

The resulting mixture was dip-coated in some instances and sprayed in others on the outer surface of regenerated cellulose tubing and the tubing heated in a hot air tunnel to about 80° C. and held at this temperature until the coating was dry to the touch. The coating thickness, after drying varied from 0.2 to 0.5 mil.

EXAMPLE 2

746 grams of processed linseed oil fatty acids was heated as in Example 1, and there was added thereto 504 grams of epichlorhydrin-bis-phenol resin having a melting point of 105° C. and an equivalent weight of about 174. Agitation of the mixture was continued until the clear pill stage. When the acid number was about 15, 10 grams of glycerine was then added. When the viscosity was H to K (Gardner-Holdt) at 50% nonvolatile matter in xylene, there was added 0.03 gram of cobalt as naphthenate and 0.01 gram of calcium as naphthenate.

The resulting mixture, after filtration was heated to 70° C. and 10% (based on solids content of the mixture) of 140° M. P. refined paraffin wax was added. There was concurrently added 1% of mono-tertiary butyl hydroperoxide.

This mixture was dip-coated in some instances and in other instances sprayed on a regenerated cellulose tube and air dried at 90° C. until tack-free.

EXAMPLE 3

Comparative tests on the storage characteristics of ham halves encased in treated (in accordance with the method of Example 1) and untreated tubular regenerated cellulose film casing were run as follows: Several smoked hams, identically processed, and being of substantially the same size, were cut into halves. The widest diameter across the cut surfaces was approximately nine inches. Each of the ham halves was then encased in either a treated or untreated seamless seven inch diameter tube of regenerated cellulose casing, by first wetting the tube with water, stretching it over the ham half to effect insertion therein, and then tying the ends of the tubes. After being packaged in the above manner, the ham halves were placed in a closed, meat show case at 2–4° C. for 186 hours. Shrinkage results are set forth below:

*Smoked hams*

| Type of Film | Film Thickness, mil. | Coating Thickness, mil. | Application Method | Paraffin Content, Percent | Total Moisture Loss in 186 hr., Percent |
|---|---|---|---|---|---|
| Reg. cellulose, Coated Casing. | 2.2 | 0.25 | Dip | 5.0 | 1.34 |
| Do | 2.3 | 0.2 | ...do | 7.5 | 0.47 |
| Reg. cellulose, Uncoated Casing. | 2.25 | | | | 4.01 |

EXAMPLE 4

The procedure of Example 3 was followed with the exception that cooked hams instead of smoked hams were used. The storage results were as follows:

*Cooked ham storage*

| Type of Film | Film Thickness, mil. | Coating Thickness, mil. | Application Method | Paraffin Content, Percent | Total Moisture Loss in 186 hr., Percent |
|---|---|---|---|---|---|
| Reg. cellulose, Coated Casing. | 2.1 | 0.7 | Spray | 5.0 | 0.29 |
| Do | 2.1 | 0.7 | ...do | 7.5 | 0.30 |
| Do | 2.2 | 0.8 | ...do | 10.0 | 0.22 |
| Do | 1.9 | 0.7 | Dip | none | 1.21 |
| Do | 1.9 | 0.3 | ...do | 5.0 | 0.60 |
| Reg. cellulose, Uncoated casing. | 1.9 | | | | 2.55 |

With reference to the hams encased in the treated tubular regenerated cellulose casing, in no instance was there any indication, before or after storage, of cracking, peeling or any other separation of the coating from the surface of the regenerated cellulose film base, despite the amount of stretching that was required to pull the tubes over the ham halves.

So far as I am aware, no other type of waxed, lacquered or varnished regenerated cellulose tubular film casing will work satisfactorily under such conditions as are demanded in providing a packaged commodity as hereinbefore described. A further unique and important attribute of the composite casing of my invention is that it will even withstand the punishing effect of immersion in boiling water without any separation between the coating and the regenerated cellulose base. Thus I have immersed samples of casing, treated in accordance with the hereinbefore described method of my invention, in boiling water for as long as three hours without any separation or even loosening of the coating from the base. Meat items, encased in my novel casing, can be cooked without separation of the coating from the base film. On the other hand, coated regenerated cellulose films of the prior art, when immersed in boiling water result in a separation of the coating from the base within a few minutes.

While my novel composite casing is eminently useful without further modification, it may be modified by applying an additional coating or coatings thereto, such as heat-sealing lacquers, light barrier components, or lacquers containing additional moisture proofing wax, such additional coatings being placed on top of the already coated casing which functions as an anchor coat for such additional coating or coatings. Also opacifiers such as titanium dioxide, and color imparting pigments may be added to one or more of the coating mixtures used in coating regenerated cellulose film in accordance with my invention.

While the method of my invention is applicable to the production of new and valuable composite regenerated cellulose packaging materials in sheet form, it is particularly and uniquely adapted to the production of such packaging materials in tubular form, particularly seamless tubular form, which, in use, must be wetted and then stretched up to 50% or even more to encase an irregularly shaped moisture containing item in a tight package.

Accordingly, it is seen that the composite casing of my invention meets to a substantially greater degree than do prior art casings, the rigid functional requirements demanded by meat items which are particularly sensitive to dehydration, discoloration and anaerobic deterioration and which are to be packaged in a stretchable film, and especially in seamless regenerated cellulose tubing.

While my invention has been described as embodied in certain preferred forms, it is to be understood that these are illustrative only and that modifications thereof will readily occur to those skilled in the art.

I claim:

1. A substantially stretchable moisture and moisture-vapor resistant packaging material comprising a regenerated cellulose tube having bonded to the surfaces thereof a thin continuous coating formed by first coating said tube with a film of a material comprising drying oil fatty acid esters of the reaction product of epichlorhydrin and bis phenol, and a paraffin wax and then heating said tube to polymerize and concurrently bond said material to said surfaces.

2. A meat casing comprising a plasticized regenerated cellulose tube having bonded to the surface thereof a coating comprising polymerized drying oil fatty acid esters of the reaction product of epichlorhydrin and bis phenol, and a paraffin wax.

3. A casing for meat products comprising a regenerated cellulose tube having bonded to the surface thereof a thin film of a mixture comprising polymerized drying oil fatty acid esters of the reaction product of epichlorhydrin and bis phenol, and paraffin wax.

4. A meat casing comprising a regenerated cellulose tube coated with a continuous thin film formed by applying to the surface of said tube a liquid mixture comprising drying oil fatty acid esters of the reaction product of epichlorhydrin and bis phenol, glycerol, a metallic dryer for said esters, a hydroperoxide accelerator and a paraffin wax, and then heating the said tube.

5. A method of producing a food casing which comprises applying to the surface of regenerated cellulose tubing a coating of a fluid mixture comprising drying oil fatty acid esters of the reaction product of epichlorhydrin and bis phenol, a metallic dryer, glycerol, a hydroperoxide accelerator and paraffin wax, and heating the thus coated tubing.

6. A method of producing a food casing which comprises applying to the surface of regenerated cellulose tubing a thin coating of a fluid mixture comprising drying oil fatty acid esters of epichlorhydrin bis phenol resin, metallic naphthenates, about 5% to 10% based on the solids of refined paraffin wax having a melting point of about 125° to 140° C., about 1% of a hydroperoxide accelerator, and heating the resulting tubing sufficiently to dry the said coating.

LAURENCE E. DOWD.

REFERENCES CITED

The following references are of record in the file of this patent:

UNITED STATES PATENTS

| Number | Name | Date |
|---|---|---|
| 2,022,490 | Charch | Nov. 26, 1935 |
| 2,301,959 | Lanning | Nov. 17, 1942 |
| 2,456,408 | Greenlee | Dec. 14, 1948 |